United States Patent [19]
Willinger et al.

[11] 3,815,547
[45] June 11, 1974

[54] FILTERING DEVICE

[75] Inventors: Allan H. Willinger, New Rochelle; Albert J. Dinnerstein, Brooklyn, both of N.Y.

[73] Assignee: Metaframe Corporation, Maywood, N.J.

[22] Filed: Oct. 13, 1972

[21] Appl. No.: 297,380

[52] U.S. Cl. ................................................. 119/5
[51] Int. Cl. ............................................ A01k 63/00
[58] Field of Search ..................... 119/3, 5; 210/169

[56] References Cited
UNITED STATES PATENTS

| | | | |
|---|---|---|---|
| 3,149,608 | 9/1964 | Murphy | 119/5 |
| 3,377,991 | 4/1968 | Rubert | 119/5 |
| 3,390,665 | 7/1968 | Winninger | 119/5 |
| 3,529,574 | 9/1970 | Kelley et al. | 119/5 |
| 3,557,753 | 1/1971 | Dantoni | 119/5 X |

*Primary Examiner*—Antonio F. Guida
*Assistant Examiner*—J. N. Eskovitz
*Attorney, Agent, or Firm*—Friedman & Goodman

[57] ABSTRACT

A filtering device for use with an aquarium filled with a liquid has a lower porous filtering portion positioned below the surface level of the liquid and an upper non-porous portion positioned above the level of the liquid. The filtering device is arranged in a generally vertical plane in the aquarium to form first and second compartments. A pump, of any conventional type, is provided to pump the liquid from one compartment to the other and to cause a differential surface level of the liquid in the compartments, this causing a flow of liquid through the lower porous portion of the filtering device from the compartment having the higher liquid level to the compartment having the lower liquid level. A hole is provided in the upper non-porous portion, normally located above the liquid level, to permit liquid to flow from one of the compartments to the other in the event that the lower porous portion becomes clogged to thereby prevent normal filter flow — as when the filtering device must be cleaned or replaced. The filtering device advantageously includes at least one higher porosity portion facing the compartment having the higher liquid level and at least one lower porosity portion facing the compartment having the lower liquid level.

16 Claims, 7 Drawing Figures

3,815,547

FILTERING DEVICE

BACKGROUND OF THE INVENTION

The present invention relates to aguarium filters, and more particularly to a filtering device which can easily be removed from the aquarium for cleaning and/or replacement.

Numerous filtering devices are already known — these usually taking the form of "Under Gravel" filters, or "Small Container" filters.

There are "Under Gravel" filters which employ a perforated platform spaced from the bottom of the aquarium, said platform being covered with gravel; and being provided with pump means to draw water down through the gravel, under the platform and back up to the main compartment of the aquarium. These filters are very efficient in that the large area of the filter combined with the moderately oxygenated water from the aquarium cause much of the debris trapped by the filter to be digested by aerobic bacteria which attach themselves to the filter material. For this reason, "Under Gravel" filters can function for months without cleaning. The disadvantages of such filters reside in the fact that: they are very inconvenient to clean when they become clogged, there is no convenient means to discover when the filter material is clogged, aquarium plants rooted in gravel which is employed as a filter do not flourish as they do in gravel not used as a filter medium and that the addition of water purifying activated carbon to such a filter requires unsightly supplemental structures.

All other conventional aquarium filters are "Small Containers," located in a lower corner of the aquarium, or suspended outside the aquarium. These small containers can be cleaned more easily than Undergravel Filters, do not injure rooted aquarium plants, and provide simple means for indicating if the filter material is clogged. However, their small size limits the quantity and area of filtering material contained therein. Being too small to permit significant bacterial digestion of waste material, they require very frequent cleaning. The size of these chambers is limited by the cost of the material for the walls of such chambers and by the problem of locating them in a convenient and aesthetic manner.

A further disadvantage associated with all existing aquarium filters is that the optimum temperature for bacterial digestion of waste material is 85° to 95° F. while the optimum temperature for most pet fish is 68° to 82° F. The heaters used in aquariums should, for efficient water purification, be located close to the filtering material, but no existing filter configurations can locate the heater in the preferred proximity without relying on the filter pump mechanism to carry the heated water to the main body of the aquarium. When existing filter structure preferentially heat the filter material, the heater becomes functionally isolated from the aquarium when, for various reasons, the filter pump is inoperative.

SUMMARY OF THE INVENTION

Accordingly, it is an object of the present invention to provide a filtering device for an aquarium which does not have the disadvantages possessed by the known filtering devices.

It is another object of the present invention to provide a filtering device for an aquarium which is simple in construction and economical to manufacture.

It is still another object of the present invention to provide a filtering device as discussed above which does not require frequent cleaning or replacement.

It is a further object of the present invention to provide a filtering device for an aquarium of the type under discussion which provides simple and reliable means for determining when the filter must be cleaned or replaced.

It is yet a further object of the present invention to provide a filtering device for an aquarium which may be easily removed for cleaning or replacement without disturbing the gravel or other objects normally contained in a fish aquarium.

It is still yet another object of the present invention to provide a filtering device which is visually inconspicuous.

It is a further object of the present invention to provide a filtering device for an aquarium which is not detrimental to the existence or growth of the aquatic plants normally found in aquariums.

It is yet another object of the present invention to provide a filtering device for an aquarium which effectively digests aquarium wastes by providing means for preferentially heating and oxygenating the water passing through the filter material.

To accomplish the above, as well as other objects, the filtering device in accordance with the present invention, comprises a substantially planar porous section adapted to be arranged in a substantially vertical plane and at least partially spaced from one of the vertical walls of an aquarium. The planar section extends across the interior of the aquarium so as to form first and second compartments. Pumping means are provided for pumping liquid from one of said compartments to the other of said compartments. In this manner, the level of the liquid in said other compartment tends to exceed the level in said one compartment, the differential level thus created causing a flow of the fluid through the porous section from said other compartment to said one compartment.

According to one presently preferred embodiment, wherein the filtering device is used in an aquarium which is rectangular and having a longer and shorter pair of vertical opposite sides, said planar porous section comprises a perforated water impervious panel and a filter panel adjacent to and supported by said perforated panel. The perforated panel is joined to each of said shorter sides by means of silicone rubber cement. According to another advantageous feature of the present invention, wherein the filtering device is utilized in an aquarium having a greater height than the width of its shorter pair of walls, said filter panel will have an area greater than the area available to an Under Gravel filter, which is equal to the area of the base of the aquarium.

The filter panel is advantageously made from a polyester floss plastic having two layers of different porosity foam plastic — a first lower porosity portion facing said one compartment and a second higher porosity portion facing the other compartment.

Said impervious panel has a lower perforated portion and an upper portion, the liquid being permitted to flow through the perforations of said lower portion during normal filtering action. The filtering device is utilized in the aquarium in which the level of the liquid is normally at a predetermined level. Said upper portion is provided with aperture means in the form of at least one hole above said predetermined level so that when clogging of the filter occurs — this reducing the porosity of the planar porous section in the lower portion and thus the flow of the liquid from said other to said one compartments therethrough — the liquid is permitted to return from said other to said one compartments through said aperture means once the level in said other compartment reaches the level of said aperture means.

Said filtering device is positioned in the aquarium so that the volume of said one compartment is substantially smaller than the volume of said other compartment. As aquariums are commonly constructed, the perforated partition could advantageously be parallel to, and spaced from, the back wall of the aquarium. If the partition is molded in a decorative shape, such as a stone wall, it will provide an unobtrusive and pleasing background for the first compartment. The visually concealed compartment can be used to contain the aquarium heater, and a basket or bag of activated carbon as well as the filter material.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which.

DETAILED DESCRIPTION OF THE PREFERRED EMBODIMENTS

Figure 1:
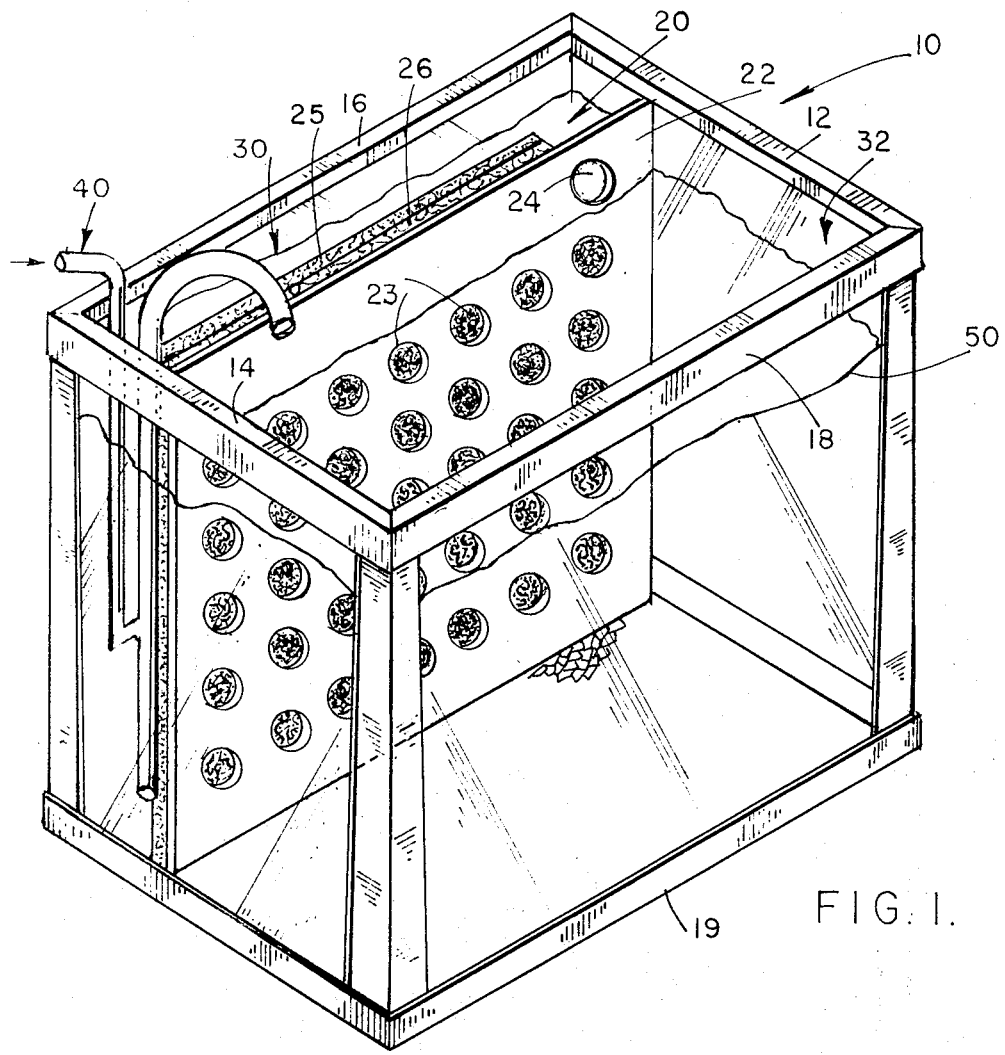
FIG. 1 is a perspective view of an aquarium in which a filtering device in accordance with the present invention is housed, showing the pumping means arranged to pump water from the smaller to the larger compartments formed by the filtering device.

A conventional rectangular aquarium 10 has side walls 12 and 14, a rear wall 16, a front wall 18 and a bottom wall 19. Each wall or side defines an upper horizontal rim. The aquarium itself is conventional, but cooperates with the filter device to form part of the present invention; the filter must be located inside an aquarium and the walls of the aquarium function to help define fluid flow inducing chambers. The filtering device in accordance with the present invention is generally designated by the reference numeral 20 and, differs from conventional Under Gravel filter platforms only in detail, orientation and function and according to the presently preferred embodiment, it comprises an impervious section of panel 22 which has a lower portion and upper portion defining an upper horizontal edge. The lower portion is generally positioned below the water surface while the upper portion is generally positioned above the water surface, as will be more fully described hereinafter. The lower portion is provided with a plurality of perforations 23, and shown in FIG. 1 to consist of a plurality of holes. However, the perforations 23 may have any other desired configurations. Also, the perforations 23 may be of any suitable size so that the perforations may consist of relatively large holes as shown or may consist of small apertures approaching the size found in fine mesh screens. With respect to the lower portion of the impervious section 22, it is only important that this section permit the flow of water therethrough without undue resistance. The upper portion of the section 22 is impervious to the flow of water with the exception of the aperture means 24, shown in FIG. 1 to consist of a hole. The hole 24 serves as an indicating means of the condition of the filter, as will be more fully described hereafter.

Adjacent to the impervious section 22, and preferably supported thereby, is a panel or layer of filtering material which traps the particles to be filtered from the water subsequent to passage through the various perforations 23. Although a single layer of filtering material with one degree of porosity may be used, the presently preferred embodiment contemplates the use of two adjacent and coextensive layers of filtering material. A first high porosity portion is provided immediately adjacent to the impervious section while a second lower porosity portion is provided adjacent to the high porosity portion 26 so that the latter portion is sandwiched between the lower portion 25 and the impervious section 22. The layered construction of the filtering device can best be seen in FIGS. 2 and 3.

Figure 2:
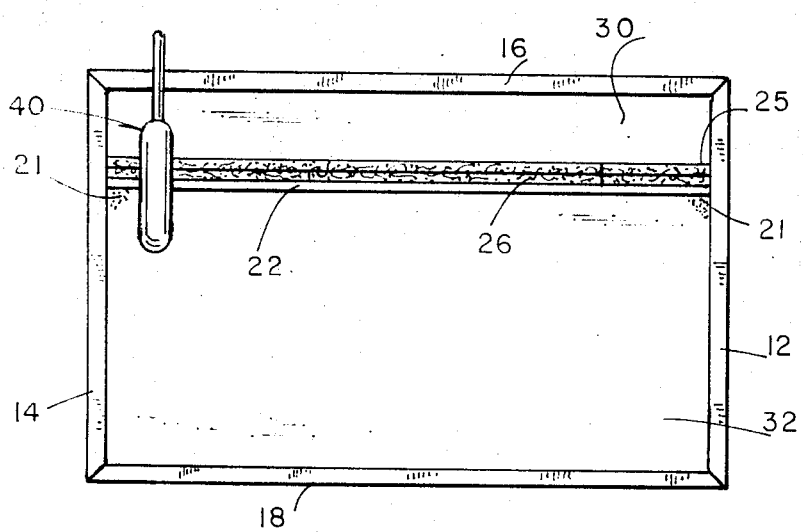
FIG. 2 is a top view of the aquarium and filtering device shown in FIG. 1.
Figure 3:
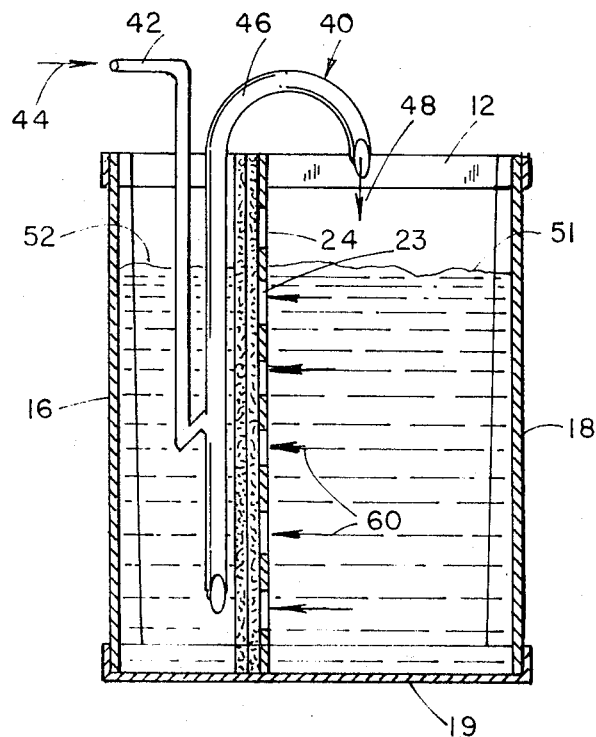
FIG. 3 is a cross-section taken at a plane substantially parallel to the side walls of the aquarium shown in FIG. 1, showing the details of the filtering device as well as the flow of water in the aquarium during normal filtering action.

The filtering device, as shown in FIGS. 1-3, extends longitudinally of the aquarium 10 between side walls 12, 14 and is preferably arranged in the aquarium so as to form water tight seals at the edges of the imprevious section 22 extending adjacent to the side walls 12, 14 as well as the bottom wall 19. This can be accomplished, for example, by providing cement 21 at the edges of the impervious section 22 to the side walls 12, 14. The filtering material 25, 26 can then be pressed against to make sealing contact with impervious section 22. The impervious section 22 can also be maintained in a vertical direction by the use of clamps or brackets (not shown) which are connected to the impervious section and respectively cooperate with the side walls or the bottom wall.

The filtering device is positioned, as suggested above, in a generally vertical plane parallel to the rear and front walls 16, 18 respectively. As shown in FIGS. 1-3, one of the preferred arrangements of the filtering device 20 is such that the filtering device 20 and the rear wall 16 cooperate to form a small volume compartment 30 while the filtering device and the front wall 18 form a higher volume compartment 32 — the filtering device forming a common wall with each of the compartments. As shown clearly in FIG. 2, the partition 22 is parallel to the back wall 16. This is a simple and effective design. Without changing the essence of the invention, however, the portion 22 could be curved; it could abut the corner formed by walls 16 and 14 and curve out away from wall 16 and back again to abut the corner formed by walls 16 and 12.

Pumping means 40 is provided which may be a conventional air lift pump or any other suitable pumping means which can pump water from one of the compartments to the other. In the first arrangement of the present invention (FIGS. 1–3), the air lift pump 40 is positioned in the small volume compartment 30 and is arranged to pump filtered water from the small volume compartment 30 into the high volume compartment 32. The air lift pump 40 generally comprises an air tube 42 (FIG. 3) which is connected to an air pump (not shown) in the conventional manner, the arrow 44 showing the direction of flow of air into the air lift pump 40. A water transport tube 46 is connected to the air tube 42 through which the water pumped from the small compartment 30 into the large or high volume compartment 32 is pumped, as generally illustrated by the arrow 48. To minimize visual obstrusiveness when the system is viewed from above, the air lift pump 40 passes through the filter device 20 rather than extend over its upper edge.

The operation of the filtering device will now be described. When the pumping means 40 is inoperative, the common level of the water in the aquarium 10 is generally represented by the reference numeral 50. The level 50 is at the same height from the bottom wall 19 in both compartments 30, 32 due to the equilization of pressures through the perforations 23. Once the air lift pump 40 is initiated and water is pumped from the compartment 30 into the compartment 32, there will be created a level 51 in the compartment 32 which tends to rise above the level 52 in the compartment 30, as can best be seen in FIG. 3. This tendency to create a differential level in the two compartments causes a flow of water from the compartment 32 to the compartment 30 through the perforations 23, as illustrated by the arrows 60 in FIG. 3. The flow 60 of water through the perforations 23 first meet the high porosity portion 26 which traps the larger particles to be filtered while permitting the smaller particles to pass therethrough. The water then passes through the lower porosity portion 25 which traps the smaller particles. The water, upon reaching the compartment 30 is filtered and substantially free of particles. It is this filtered water in the compartment 30 which is transported via the air lift pump 40 into the larger compartment 32 where the fish or other aquatic forms of life are contained.

Activated carbon (not shown) and an aquarium heater (not shown) would normally be located in compartment 30. The heater, so located, will maintain the filter material 25, 26 at a higher temperature than the water in compartment 32 and thus facilitate bacteriological digestion of debris trapped in the filter material 25, 26.

In order to provide adequate filtering and, therefore, permit a relatively high fish population, the cross-sectional area of the filter material 25, 26 is advantageously selected to be at least equal to the cross-sectional area of the bottom wall or base 19. To accomplish this, the filtering device 20 is advantagously arranged substantially parallel to the longer walls of the aquarium 10, although the present invention can equally be used when the filtering device 20 is arranged parallel to the shorter walls of the aquarium, or when the filtering device is curved.

Figure 4:
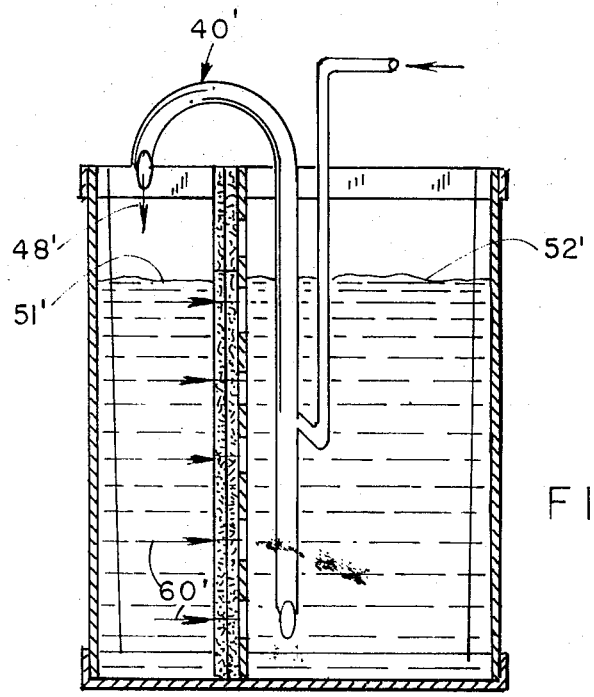
FIG. 4 is a cross-section similar to that as shown in FIG. 3, with the pumping means arranged to pump water from the larger to the smaller of the compartments formed by the filtering device.
Figure 5:
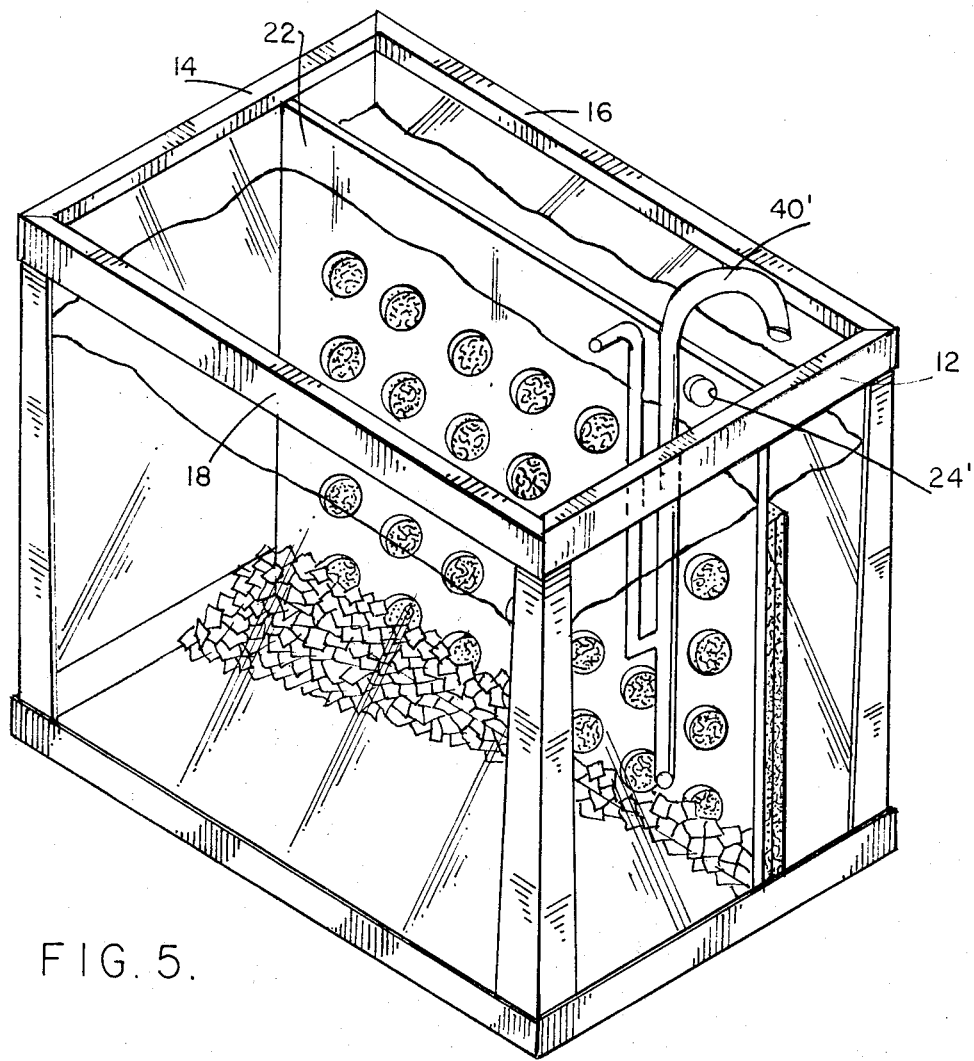
FIG. 5 is a perspective view of the aquarium as shown in FIG. 4.
Figure 6:
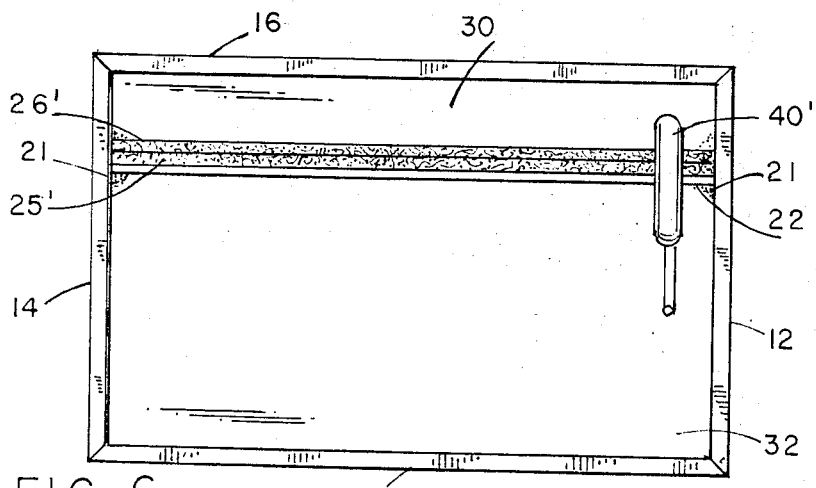
FIG. 6 is a top plan view of the aquarium as shown in FIG. 5.

FIGS. 4, 5 and 6 represent a different and usually more advantageous arrangement of the pumping means 40 in relation to the filtering device 20 than the first arrangement described above. However, in most other respects, the operation of the filtering device is identical with that described. In this new arrangement, the filtering means 40' is positioned in the high volume compartment 32 and is arranged to pump water from that compartment to the small volume compartment 30, as generally indicated by the arrow 48'. With this type of pumping action, the level 51' in the small volume compartment 30 tends to rise above the level 52' in the high volume compartment 32. This tendency to form a differential water level causes a flow of water in the aquarium as generally indicated by the arrows 60'. While the two arrangements are similar in most respects, with the arrangement presently under discussion the order of the filtering portions are changed so that the low porosity portion 25' is sandwiched between the high porosity portion 26' and the impervious seciton 22. As before, the larger particles are trapped by the high porosity portion 26' while the smaller particles are trapped in the low porosity portion 25'. Because of the relatively low resistance of the filtering device 20, the levels 51, 52 and 51', 52' respectively are essentially the same — the flows 60 and 60' being substantially equal to the respective flows 48 and 48'.

The advantages associated with the embodiment shown in FIGS. 4 and 5 are that in this embodiment, debris trapped by the filter material is concealed from view and the debris is exposed to the highly oxygenated water of the air lift pump to facilitate bacterial digestion of said debris, and with a heater located in the low volume compartment 30, the direction of water flow most effectively heats debris trapped in filter material 25, 26. In this embodiment, waste digestion is so remarkably efficient that the filter material 25, 26 need be cleaned or replaced no more often than once a year.

Figure 7:
FIG. 7 is a fragmented portion of the filter panel forming part of the filtering device in accordance with the present invention, showing two separate layers of higher and lower porosity portions.

FIG. 7 shows schematically the filtering material which may be used in conjunction with the present invention. A single porosity material or two-layered low and high porosity portions 25, 26 may be utilized — both of these filtering materials being conventional and known to those familiar with the filtering art. For example, the filtering material may consist of a double density resin bonded polyester floss plastic mat or a double density open cell foam plastic mat.

Both of the above described arrangements have the advantage that they simply and reliably indicate when the filter material must be cleaned or replaced. First, referring to FIG. 3, when the filtering material becomes clogged by the particles entrapped therein, the resistance to the flow 60 increases and less water from the compartment 32 is permitted to flow into the compartment 30 per unit time. However, the air lift pump 40 continues to pump water from the compartment 30 into the compartment 32 at substantially the same rate. Because the equilibrium between the flows 48 and 60 is disturbed, these now being unequal, the water level 51 begins to rise at a faster rate relative to the falling level 52. A point is reached, when the filter is clogged, when the level 51 reaches the height of the hole 24 in the upper portion of the impervious section 22 while the level 52 continues to drop. At such time, the water in the compartment 32 flows into the compartment 30 through the hole 24 — this being fully visible to an observer. Such a construction is particularly useful for two reasons. Firstly, the indication is clear, reliable and economically obtained. Secondly, this feature prevents the water level 51 from continually rising and possibly flowing out from the aquarium 10 should the clogged filter indication not be immediately observed. If effect, the water flow through the hole 24 replaces the flow 60 through the filter so that continued operation with the clogged filter again results in a steady state condition where the flow 48 is made equal to the flow through the hole 24. Similarly, in FIG. 4, the operation with a clogged filter material causes the level 51' to rise to the level of the hole 24 and flow through the hole 24 replaces the flow 60' through the filter material. In each case, flow through the hole 24, not existent prior to clogging of the filter, is an indication that the filter must be cleaned or replaced. While only one hole 24 has been shown in the upper portion of the impervious section 22, more than one aperture may be provided — the exact number not being a critical feature of the present invention.

A further advantage of both described embodiments is that the aquarium heater can be located in the smaller volume compartment 30 in proximity with the filter material 25, 26 to preferentially heat said filter material. When the water pump 40 is in operation, the heated water is carried to the larger volume compartment 32 by the pump to maintain a proper temperature for the fish living therein. If the water pump 40 should cease to operate, adequate heat will be transferred from the smaller compartment 30 to the larger compartment 32 by convection currents and diffusion which move the water through the porous filter material 25, 26 and the perforations 23.

To replace the filter material or filter panel after the same has been clogged is especailly simple with the present invention. Thus, after the pumping means 40 has been removed, the filtering device 20 may, in accordance with one embodiment of the present invention, be pulled upwardly and completely removed from the aquarium 10. According to another embodiment of the present invention, in which the impervious section 22 is cemented to the side walls 12, 14, the filter portions 25, 26 may separately be lifted upwardly for cleaning or replacement. Sliding guide means (not shown) of any conventional type may be provided for guiding the filter sections 25, 26 downwardly into abutment with the impervious section 22 and upwardly for removal and/or replacement.

According to another advantageous feature of the present invention, the filtering material is not provided in the region of the hole 24 so as not to obstruct the flow therethrough once the filter material becomes clogged. In this manner, all the water which flows from the pump may immediately return into the compartment from which it is pumped.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A filtering device for an aquarium including a plurality of vertical walls, the filtering device comprising a substantially planar porous section of filtering material having an upper horizontal edge when mounted in the aquaruim and being removably positioned in a substantially vertical plane spaced from at least one of the vertical walls to form first and second compartments within the aquarium; pumping means for pumping liquid from one of said compartments to the other of said compartments over said horizontal edge of said filtering material, said pumping means and said porous section being fully removable from the aquarium by lifting the same in an upward direction without disturbing sand or ornamental devices disposed in the aquarium, whereby when pumping action occurs the level of the liquid in said other compartments tends to exceed the level in said one compartment, the differential level causing a flow of the liquid through said porous section from said other compartment to said one compartment.

2. A filtering device as defined in claim 1, further comprising means for maintaining said planar porous section in said vertical plane.

3. A filtering device as defined in claim 1, in combination with an aquarium which is rectangular and having a pair of longer vertical opposite sides, and a pair of shorter vertical opposite sides wherein said planar porous section extends between and substantially against a pair of said opposite sides.

4. A filtering device as defined in claim 3, wherein said pair of sides is the shorter pair.

5. A filtering device as defined in claim 1, wherein said planar porous section comprises a perforated water impervious panel and a filter panel adjacent to said perforated impervious panel.

6. A filtering device as defined in claim 5, wherein said filter panel is made from a polyester plastic floss bonded into a coherent layer.

7. A filtering device as defined in claim 5, wherein said filter panel is made from a plastic foam.

8. A filtering device as defined in claim 1, wherein said filter panel is made from a double porosity material having a first lower porosity portion facing said one compartment and a second higher porosity portion facing said other compartment.

9. A filtering device as defined in claim 5, wherein said impervious panel is substantially coextensive with said filter panel, said impervious panel having a lower perforated portion and an upper portion, the liquid being permitted to flow through the perforations in said lower portion.

10. A filtering device as defined in claim 1, in combination with an aquarium having vertical sides each defining an upper horizontal rim, said upper horizontal rims being substantially coextensive with said upper horizontal edge, further comprising aperture means provided in said upper portion proximate to said upper horizontal edge, whereby clogging of the filter which reduces the porosity of the filter and thus the flow of the liquid from said other to said one compartments causes the liquid to rise excessively above a normal level and return from said other to said one compartments through said aperture means when the level in said other compartment reaches the level of said aperture means without flowing over said upper horizontal rims.

11. A filtering device as defined in claim 10, wherein said aperture means comprises at least one hole formed in said upper portion.

12. A filtering device as defined in claim 1, wherein said porous section is positioned in the aquarium so that the volume of said one compartment is substantially smaller than the volume of said other compartment.

13. A filtering device as defined in claim 12, further comprising a mass of activated carbon positioned inside said one compartment.

14. A filtering device as defined in claim 12, further comprising an aquarium heater positioned inside said one compartment.

15. An aquarium comprising a plurality of vertical sides each defining an upper rim; a substantially planar porous section of filter material having an upper horizontal edge substantially coextensive with said upper rims when mounted in the aquarium and being removably positioned in a substantially vertical plane spaced from at least one of said vertical walls to form first and second compartments within the aquarium; pumping means for pumping liquid from one of said compartments to the other of said compartments over said horizontal edge of said filtering material, said pumping means and said porous section being fully removable from the aquarium by lifting the same in an upward direction without disturbing sand or ornamental devices disposed in the aquarium, whereby when pumping action occurs the level of the liquid in said other compartment tends to exceed the level in said one compartment, the differential level causing a flow of the liquid through said porous section from said other compartment to said one compartment.

16. An aquarium as defined in claim 15, wherein said planar porous section comprises a perforated water impervious panel and a substantially coextensive filter panel, said impervious panel having a lower perforated portion through the liquid normally flows and an upper portion provided with aperture means proximate to said upper horizontal edge, whereby clogging of the filter which reduces the porosity of the filter and thus the flow of the liquid from said other to said one compartments causes the liquid to rise excessively above a normal level and return from said other to said one compartment through said aperture means when the level in said other compartment reaches the level of said aperture means without flowing over said horizontal rims.

* * * * *